(12) United States Patent
Yamada et al.

(10) Patent No.: US 7,781,094 B2
(45) Date of Patent: Aug. 24, 2010

(54) MICROPOROUS COMPOSITE MEMBRANE AND ITS PRODUCTION METHOD AND USE

(75) Inventors: Kazuhiro Yamada, Tochigi-ken (JP); Koichi Kono, Saitama-ken (JP)

(73) Assignee: Tonen Chemical Corporation, Tokyo (JP)

( * ) Notice: Subject to any disclaimer, the term of this patent is extended or adjusted under 35 U.S.C. 154(b) by 1069 days.

(21) Appl. No.: 10/595,881

(22) PCT Filed: Nov. 17, 2004

(86) PCT No.: PCT/JP2004/017061
§ 371 (c)(1),
(2), (4) Date: May 17, 2006

(87) PCT Pub. No.: WO2005/049318
PCT Pub. Date: Jun. 2, 2005

(65) Prior Publication Data
US 2007/0072069 A1 Mar. 29, 2007

(30) Foreign Application Priority Data
Nov. 19, 2003 (JP) .............................. 2003-389841

(51) Int. Cl.
*H01M 2/16* (2006.01)
*H01M 2/18* (2006.01)
*B05D 3/02* (2006.01)
*B32B 27/08* (2006.01)

(52) U.S. Cl. ..................... 429/145; 427/385.5; 428/515
(58) Field of Classification Search ................. 429/181, 429/145; 427/385.5
See application file for complete search history.

(56) References Cited

U.S. PATENT DOCUMENTS

| 6,302,934 | B1 | 10/2001 | Nabata et al. |
| 6,468,698 | B1 * | 10/2002 | Hamano et al. ............. 429/316 |
| 2002/0015299 | A1 | 2/2002 | Koyama et al. |

(Continued)

FOREIGN PATENT DOCUMENTS

EP   1005891   6/2000

(Continued)

OTHER PUBLICATIONS

Ren Xu-Mei et al., Preparation of Polymer Electrolyte for Lithium-ion Battery, School of Chemical Engineering and Materials Science, Beijing Institute of Technology, Jul. 2002, pp. 1383-1385, vol. 23 No. 7, Jul. 2002, Laboratory for Solid State Ionics, Institute of Physics, Chinese Academy of Sciences, China.

(Continued)

*Primary Examiner*—Patrick Ryan
*Assistant Examiner*—Brent Thomas
(74) *Attorney, Agent, or Firm*—Sughrue Mion, PLLC (57) ABSTRACT

A microporous composite membrane obtained by coating at least one surface of a microporous polyolefin membrane with a solution of a gelable fluororesin in a mixed solvent of a good solvent for the fluororesin, and a poor solvent having a dipole moment of 1.8 Debye or less and drying to form a porous coating layer of the above fluororesin has cylindrical penetrating pores formed in the above coating layer, with well-balanced permeability, adhesion to electrodes, mechanical strength, heat shrinkage resistance, shutdown properties and meltdown properties.

1 Claim, 1 Drawing Sheet

U.S. PATENT DOCUMENTS

2003/0108797 A1 * 6/2003 Iijima et al. .................. 429/254
2004/0202928 A1 * 10/2004 Miyamoto et al. .......... 429/137

FOREIGN PATENT DOCUMENTS

| EP | 1 022 130 A1 | 7/2000 |
| EP | 1022130 A1 | 7/2000 |
| EP | 1310005 A1 | 5/2003 |
| JP | 06-198146 | 7/1994 |
| JP | 06-224526 | 8/1994 |
| JP | 6-224526 A | 8/1994 |
| JP | 08-258198 | 10/1996 |
| JP | 8-258198 A | 10/1996 |
| JP | 11-207888 | 8/1999 |
| JP | 211-207888 A | 8/1999 |
| JP | 2000-211073 A | 8/2000 |
| JP | 2000-225328 A | 8/2000 |
| JP | 2001-118558 | 4/2001 |
| JP | 2002-216734 A | 8/2002 |
| JP | 2002-240215 | 8/2002 |
| JP | 2002-240215 A | 8/2002 |
| JP | 2002240215 A * | 8/2002 |
| JP | 2004-506542 A | 4/2004 |
| WO | WO 0215299 A1 | 2/2002 |
| WO | 02/50929 A2 | 6/2002 |

OTHER PUBLICATIONS

Xiao Qiangfeng et al., Microporous Solid P (VDF-HFP) Electrolyte, Department of Chemical Engineering, School of Materials Science and Engineering, Tsinghua University, Feb. 2003, pp. 139-141, No. 1, Beijing China.

Guojie Wang, et al, Preparation of (vinylidene fluoride-hexafluoro propylene) copolymer-based symmetric microporous membranes by a dry/wet phase inversion method, Institute of Material Science; South China University of Technology; Guangzhou 510641; China, Membrane Science and Technology, vol. 21, No. 6, Dec. 2001.

Chinese Office Action corresponding to Chinese Application No. 2004800341903 dated Jan. 8, 2010.

* cited by examiner

MICROPOROUS COMPOSITE MEMBRANE AND ITS PRODUCTION METHOD AND USE

FIELD OF THE INVENTION

The present invention relates to a microporous composite membrane and its production method and use, particularly to a microporous composite membrane having well-balanced permeability, adhesion to electrodes, mechanical strength, heat shrinkage resistance, shutdown properties, and meltdown properties, and its production method and use.

BACKGROUND OF THE INVENTION

Microporous polyolefin membranes are widely used for various applications such as battery separators used for lithium batteries, etc., various capacitor separators, various filters, moisture-permeable, waterproof clothes, reverse osmosis filtration membranes, ultrafiltration membranes, microfiltration membranes, etc.

Separators for lithium secondary batteries and lithium ion battery batteries are required not only to close fine pores to stop the battery reaction when abnormal heat generation occurs by the short-circuiting of external circuits, overcharge, etc., thereby preventing the heat generation, ignition, explosion, etc. of the batteries, but also to keep their shapes even at high temperatures to prevent the dangerous direct reaction of positive electrode materials with negative electrode materials. However, microporous polyolefin membranes widely used as separators at present, which are stretched in the production process, do not have high shape retention properties at high temperatures.

As portable electronic equipments and laptop personal computers have got smaller and lighter in weight, lithium ion secondary batteries have been made thinner with higher capacity, and to prevent the reduction of battery capacity, short-circuiting between electrodes, decrease in cycle performance, etc., which would occur as a result of the size reduction of the batteries, separators are required to have improved adhesion to electrodes. With respect to this point, too, however, conventional microporous polyolefin membranes are not satisfactory.

As a separator excellent in both ion conductivity and adhesion to electrodes, JP2001-118558A proposed a separator for lithium ion secondary batteries, which comprises ion-conductive polymer layers having a thickness of 5 μm or less dispersed on at least one surface of a microporous polyolefin membrane at a surface-covering ratio of 50% or less. However, it may be difficult to control pore diameters of the ion-conductive polymer layers, because this separator is produced by simply coating at least one surface of the microporous polyolefin membrane with an ion-conductive polymer solution and drying it. As a result, the separator is likely to have insufficient permeability.

As a separator having shutdown properties and an electrolytic solution retention, JP2002-216734A proposed a lithium battery separator constituted by a three-layer microporous membrane comprising microporous surface layers made of a vinylidene fluoride-containing copolymer having a melting point of 145° C. or lower, and a microporous intermediate layer made of a polyolefin having a melting point of 140° C. or lower. This separator is produced by (1) a method of forming a microporous membrane made of a vinylidene fluoride-containing copolymer and a microporous polyolefin membrane in advance, overlapping them, and stretching and press-bonding them, or (2) a method of simultaneously extruding solutions of the above polymers, cooling them to cause phase separation to form a three-layer sheet, and stretching it after removing a membrane-forming solvent, or removing a membrane-forming solvent after stretching it.

However, fine pores are likely to be closed by the press-bonding in the above method (1), and stretching should be conducted at a high magnification to obtain a high-permeability membrane in the above method (2), thereby failing to achieve good heat shrinkage resistance. Further, any of the above methods (1) and (2) suffers the problem that peeling is likely to occur unless the microporous membrane layers have melting points close to each other.

As a microporous membrane with improved absorption of a electrolytic solution in the production process of batteries, improved cycle properties, etc., the applicant previously proposed a composite membrane comprising a porous coating layer of a gelable functional polymer formed on at least one surface of a microporous polyolefin membrane, the porous coating layer having an average diameter larger than the maximum pore diameter of the microporous polyolefin membrane (JP2002-240215A). This composite membrane is produced by (1) a method of coating at least one surface of the microporous polyolefin membrane with a polymer dissolved in a good solvent, immersing the coated microporous membrane in a poor solvent to cause phase separation, and drying it, (2) a method of coating at least one surface of the microporous polyolefin membrane with a polymer dissolved in a mixed solvent of a good solvent and a poor solvent, evaporating the good solvent selectively to cause phase separation, and removing the remaining solvent, or (3) a method of coating at least one surface of the microporous polyolefin membrane with a polymer dissolved in a good solvent, cooling it to cause phase separation, and drying it.

It has been found, however, that because immersion in a poor solvent is conducted in the above method (1), the resultant composite membrane is likely to suffer the peeling of a coating layer, resulting in separators with insufficient adhesion to electrodes and with insufficiently formed fine pores. It has also been found that because the poor solvent is not optimized in the above method (2), sufficient fine pores may not be formed in the coating layer. In the above method (3), because only a good solvent is used, the control of pore diameters of the porous layer is likely to be difficult, resulting in separators with insufficient permeability.

Microporous polyolefin membranes characterized in fine pore structures are also used as separating membranes for gas-gas separation, liquid-liquid separation, solid-liquid separation, etc. Separating membranes include uniform membranes entirely having fine pore structures, non-uniform membranes having fine pore structures on or inside the membranes and coarse pore structures supporting the fine pore structures, and composite membranes comprising a microporous membrane layer and a porous support layer, etc., and they are properly selected depending on substances to be separated. Recently, microporous separating polyolefin membranes are required to have improved separating performance and mechanical strength.

Thus, JP6-198146A proposes a microfiltration membrane comprising two microporous layers, one microporous layer being thinner and finer in pores than the other microporous layer. This microfiltration membrane is produced by (1) a method of coating a microporous membrane support with a polymer composition solution, and immersing the coated microporous membrane support in a liquid miscible with a solvent in the above solution but immiscible with the polymer composition, and then solidifying the polymer composition, or (2) a method of simultaneously extruding two polymer composition solutions with different polymer compositions or concentrations to form a laminate, and then solidifying it.

In any of the above methods (1) and (2), however, two microporous layers are easily peeled as described above.

OBJECT OF THE INVENTION

Accordingly, an object of the present invention is to provide a microporous composite membrane having well-balanced permeability, adhesion to electrodes, mechanical strength, heat shrinkage resistance, shutdown properties and meltdown properties, and its production method and use.

DISCLOSURE OF THE INVENTION

As a result of intense research in view of the above object, the inventors have found that a microporous composite membrane obtained by coating at least one surface of a microporous polyolefin membrane with a solution of a gelable fluororesin in a mixed solvent of a good solvent for the fluororesin, and a poor solvent having a dipole moment of 1.8 Debye or less, and drying it to form a porous coating layer of the fluororesin has well-balanced permeability, adhesion to electrodes, mechanical strength, heat shrinkage resistance, shutdown properties and meltdown properties, with the coating layer provided with cylindrical penetrating pores. The present invention has been completed based on such findings.

Thus, the microporous composite membrane of the present invention comprises a microporous polyolefin membrane and a porous coating layer of a gelable fluororesin formed on at least one surface of the microporous polyolefin membrane, the coating layer having cylindrical penetrating pores.

The penetrating pores have an average diameter of preferably 0.1-50 μm, more preferably 0.5-10 μm. The fluororesin is preferably a vinylidene fluoride copolymer. The vinylidene fluoride copolymer is preferably a hexafluoropropylene-vinylidene fluoride copolymer. The coating layer is usually as thick as 0.001-50 μm.

The microporous composite membranes according to preferred embodiments of the present invention have the following properties (1)-(7).

(1) The average diameter of penetrating pores (average diameter of penetrating cylindrical pores) in the fluororesin layer is larger than the maximum pore diameter of the microporous polyolefin membrane.

(2) The air permeability (JIS P8117, converted to the value at 20-μm thickness) is 10-1,500 seconds/100 cc, preferably 20-1,500 seconds/100 cc.

(3) The pin puncture strength is 2,500 mN/20 μm or more, preferably 3,000 mN/20 μm or more.

(4) The heat shrinkage ratio after treated at a temperature of 130° C. for 1 hour is 35% or less, preferably 30% or less, in both longitudinal direction (MD) and transverse direction (TD).

(5) With respect to the shutdown properties, the air permeability after treated at a temperature of 130° C. for 1 hour is 10,000 seconds/100 cc or more.

(6) The meltdown temperature is 155° C. or higher.

(7) With respect to the adhesion to electrodes, after laminated with an electrode and pressed by a pressing machine while heating at 40° C. for 5 minutes, the microporous composite membrane does not easily peel off from the electrode even when immersed in an electrolytic solution.

The method of the present invention for producing a microporous composite membrane comprises the steps of coating at least one surface of a microporous polyolefin membrane with a solution of a gelable fluororesin in a mixed solvent of a good solvent for the fluororesin, and a poor solvent having a dipole moment of 1.8 Debye or less, and drying it to form a porous coating layer of the fluororesin.

The poor solvent is preferably at least one selected from the group consisting of aromatic hydrocarbons having 6 or more carbon atoms, 1-butanol, tert-butanol, and aliphatic hydrocarbons having 5 or more carbon atoms. The aromatic hydrocarbon having 6 or more carbon atoms is preferably at least one selected from the group consisting of toluene, o-xylene, m-xylene, p-xylene and ethylbenzene. The good solvent is preferably acetone.

To provide the microporous composite membrane with better properties, the microporous polyolefin membrane preferably meets the following conditions (8)-(14).

(8) The porosity is 25-95%.

(9) The air permeability (JIS P8117, converted to the value at 20-μm thickness) is 1,500 seconds/100 cc or less.

(10) The average diameter of penetrating pores is 0.005-1 μm.

(11) The tensile rupture strength is 50 MPa or more.

(12) The pin puncture strength is 2,500 mN/20 μm or more.

(13) The heat shrinkage ratio (at 105° C. for 8 hours) is 16% or less in both MD and TD.

(14) The thickness is 5-200 μm.

In order that the microporous composite membrane has better properties, the polyolefin preferably meets the following conditions (15)-(22).

(15) Polyethylene and/or polypropylene is contained.

(16) The polyethylene described in (15) above is at least one selected from the group consisting of ultra-high-molecular-weight polyethylene, high-density polyethylene, medium-density polyethylene, and low-density polyethylene.

(17) The polyethylene described in (15) or (16) above is ultra-high-molecular-weight polyethylene having a mass-average molecular weight (Mw) of $5 \times 10^5$ or more.

(18) The ultra-high-molecular-weight polyethylene described in (17) above has Mw of $1 \times 10^6$ to $15 \times 10^6$.

(19) In the polyolefin described in any one of (15)-(18) above, a ratio Mw/Mn (molecular weight distribution) of a mass-average molecular weight (Mw) to a number-average molecular weight (Mn) is 5-300.

(20) The polyolefin described in any one of (15)-(19) above includes a polyethylene composition.

(21) The polyethylene composition described in (20) above comprises ultra-high-molecular-weight polyethylene having Mw of $5 \times 10^5$ or more, and high-density polyethylene having Mw of $1 \times 10^4$ or more and less than $5 \times 10^5$.

(22) The polyolefin described in any one of (15)-(21) above is a polyolefin composition comprising at least one selected from the group consisting of branched low-density polyethylene, linear low-density polyethylene, an ethylene/α-olefin copolymer produced by using a single-site catalyst, and low-molecular-weight polyethylene having a molecular weight of $1 \times 10^3$ to $4 \times 10^3$, to impart the membrane a shutdown function, which melts the microporous membrane to close pores when the temperature is elevated inside a battery, thereby shutting current to prevent ignition, etc.

The microporous composite membrane of the present invention is useful as a battery separator.

DESCRIPTION OF THE PREFERRED EMBODIMENTS

[1] Microporous Polyolefin Membrane (1) Polyolefin

One type of a polyolefin or a composition of two or more polyolefins may be used. The polyolefin preferably comprises polyethylene and/or polypropylene. Though not particularly restricted, the mass-average molecular weight (Mw) of the polyolefin is usually $1 \times 10^4$ to $1 \times 10^7$, preferably $1 \times 10^4$ to $5 \times 10^6$, more preferably $1 \times 10^5$ to $4 \times 10^6$.

Examples of the polyethylene include ultra-high-molecular-weight polyethylene, high-density polyethylene, medium-density polyethylene, and low-density polyethylene. These types of polyethylene may be an ethylene homopolymer, or copolymers containing small amounts of other α-olefins. The α-olefins other than ethylene are preferably propylene, butene-1, hexene-1, pentene-1,4-methylpentene-1, octene, vinyl acetate, methyl methacrylate, styrene, etc. Among them, the ultra-high-molecular-weight polyethylene is preferable. The ultra-high-molecular-weight polyethylene has Mw of preferably $5 \times 10^5$ or more, more preferably $1 \times 10^6$ to $15 \times 10^6$, particularly $1 \times 10^6$ to $5 \times 10^6$. With the ultra-high-molecular-weight polyethylene having Mw of $15 \times 10^6$ or less, melt extrusion can be conducted easily.

The polyolefin more preferably comprises a polyethylene composition. The polyethylene composition may be a composition of 2 or more types of ultra-high-molecular-weight polyethylene having different Mws, a composition of similar types of high-density polyethylene, a composition of similar types of medium-density polyethylene, or a composition of similar types of low-density polyethylene, or a composition of 2 or more types of polyethylene selected from the group consisting of ultra-high-molecular-weight polyethylene, high-density polyethylene, medium-density polyethylene and low-density polyethylene. Preferable among them is a polyethylene composition comprising ultra-high-molecular-weight polyethylene having Mw of $5 \times 10^5$ or more, and polyethylene having Mw of $1 \times 10^4$ or more and less than $5 \times 10^5$. The polyethylene having Mw of $1 \times 10^4$ or more and less than $5 \times 10^5$ may be any one of high-density polyethylene, medium-density polyethylene and low-density polyethylene, particularly high-density polyethylene. The polyethylene having Mw of $1 \times 10^4$ or more and less than $5 \times 10^5$ may comprise 2 or more types of polyethylene having different Mws, or 2 or more types of polyethylene having different densities. The limitation of the Mw of the polyethylene composition to $15 \times 10^6$ or less makes melt extrusion easy. The percentage of ultra-high-molecular-weight polyethylene having Mw of $5 \times 10^5$ or more per 100% by mass of the polyethylene composition is preferably 21% or more by mass, more preferably 21-50% by mass.

Though not particularly restricted, the ratio Mw/Mn (molecular weight distribution) of the polyolefin, wherein Mw represents a mass-average molecular weight, and Mn represents a number-average molecular weight, is preferably in a range of 5-300, more preferably in a range of 10-100. The Mw/Mn of less than 5 means excessive high-molecular-weight components, making it difficult to extrude a polyolefin solution. The Mw/Mn of more than 300 means excessive low-molecular-weight components, resulting in a microporous membrane with low strength. The Mw/Mn is a measure of a molecular weight distribution. The larger this value, the wider the molecular weight distribution. In the case of a single polyolefin, the value of Mw/Mn indicates how wide its molecular weight distribution is; the larger this value, the wider the molecular weight distribution. The Mw/Mn of a single polyolefin can properly be adjusted by preparing the polyolefin by multi-stage polymerization. The multi-stage polymerization method is preferably a two-stage polymerization method comprising forming a high-molecular-weight polymer component in the first stage, and forming a low-molecular-weight polymer component in the second stage. In a case where the polyolefin is a composition, the larger the Mw/Mn, the larger differences in Mw there are between components, and vice versa. The Mw/Mn of the polyolefin composition can be properly controlled by adjusting the molecular weights and formulations of components.

When the microporous composite membrane of the present invention is used for battery separators, the polyolefin composition preferably contains polypropylene to increase meltdown temperatures, and to improve the high temperature resistance properties of batteries. The polypropylene preferably has Mw in a range of $1 \times 10^4$ to $4 \times 10^6$. The polypropylene may be not only a homopolymer, but also a block copolymer and/or a random copolymer containing other α-olefins. A preferred α-olefin contained in the block or random copolymer is ethylene. The amount of polypropylene added is preferably 80 parts by mass or less per 100 parts by mass of the entire polyolefin composition.

To improve properties for battery separators, the polyolefin composition preferably contains a polyolefin imparting a shutdown function, which may be, for instance, low-density polyethylene. The low-density polyethylene is preferably at least one selected from the group consisting of branched low-density polyethylene (LDPE), linear low-density polyethylene (LLDPE), ethylene/α-olefin copolymers produced with single-site catalysts, and low-molecular-weight polyethylene having Mw in a range of $1 \times 10^3$ to $4 \times 10^3$. The amount of the low-density polyethylene added is preferably 20 parts by mass or less per 100 parts by mass of the entire polyolefin. The larger the amount of the low-density polyethylene added, the more likely rupture takes place when stretched.

The polyolefin composition containing ultra-high-molecular-weight polyethylene may contain at least one selected from the group consisting of polybutene-1 having Mw of $1 \times 10^4$ to $4 \times 10^6$, polyethylene wax having Mw of $1 \times 10^3$ to $1 \times 10^4$, and an ethylene/α-olefin copolymer having Mw of $1 \times 10^4$ to $4 \times 10^6$, in addition to the above polyethylene having Mw of $1 \times 10^4$ or more and less than $5 \times 10^5$, the above polypropylene for improving meltdown temperature, and the above polyolefins for imparting shutdown function. When the polyolefin composition contains the other polyolefin in addition to ultra-high-molecular-weight polyethylene, the amount of the other polyolefin added is preferably 80 parts by mass or less per 100 parts by mass of the entire polyolefin composition.

(2) Production Method

The method disclosed in JP6-104736 B, for instance, can be used to produce the microporous polyolefin membrane, though not intended to be restricted to this method. Using the method disclosed in JP6-104736 B, the microporous polyolefin membrane can be produced by (i) melt-blending the above polyolefin and a membrane-forming solvent to prepare a polyolefin solution, (ii) extruding the polyolefin solution through a die lip, and then cooling it to form a gel-like molding, (iii) stretching the resultant gel-like molding, (iv) washing the stretched molding with a washing solvent to remove the membrane-forming solvent, and (v) drying the resultant membrane.

(3) Desired Properties

The microporous polyolefin membrane of the present invention desirably has a porosity of 25-95%, air permeability (JIS P8117) of 1,500 seconds/100 cc or less (converted to the value at 20-μm thickness), an average penetrating pore diameter of 0.005-1 μm, a tensile rupture strength of 50 MPa or more, a pin puncture strength of 2,500 mN/20 μm or more, a heat shrinkage ratio (at 105° C. for 8 hours) of 16% or less in both longitudinal direction (MD) and transverse direction (TD), and a thickness of 5-200 μm.

[2] Fluororesin Layer

The microporous composite membrane of the present invention has a porous coating layer of a gelable fluororesin formed on at least one surface of the microporous polyolefin membrane, the coating layer having cylindrical penetrating pores. With the fluororesin layer formed on the microporous polyolefin membrane, the adhesion to electrodes is particularly improved. Because the fluororesin layer has cylindrical fine pores, the permeability of the microporous polyolefin membrane is not deteriorated. The term "cylindrical penetrating pores" used herein means fine pores penetrating substantially perpendicularly from openings to a surface in contact with the microporous polyolefin membrane while keeping circular cross sections of substantially the same diameter, but the fine pores may not have exactly cylindrical cross sections.

The average diameter of penetrating cylindrical pores is preferably 0.1-50 μm, more preferably 0.5-10 μm. The average diameter of penetrating cylindrical pores is preferably larger than the maximum pore diameter of the microporous polyolefin membrane to improve permeability. The thickness of the fluororesin layer is usually 0.001-50 μm, though it may vary depending on the average penetrating pore diameter and porosity of the microporous polyolefin membrane. When the fluororesin layer is thinner than 0.001 μm, defects are likely to be generated. On the other hand, when it is more than 50 μm, the permeability is likely to deteriorate.

The gelable fluororesin may be at least one selected from the group consisting of polyvinylidene fluoride, polyvinyl fluoride, vinylidene fluoride copolymers and vinyl fluoride copolymer. The amount of a vinylidene fluoride unit in the vinylidene fluoride copolymer and the amount of a vinyl fluoride unit in the vinyl fluoride copolymers are both preferably 75% or more by mass, more preferably 90% or more by mass. Examples of monomers copolymerizable with vinylidene fluoride or vinyl fluoride may be hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl lactate, acrylic acid and their salts, methyl methacrylate, allyl methacrylate, acrylonitrile, methacrylonitrile, N-butoxymethyl acrylamide, allyl acetate, isopropenyl acetate, etc.

Preferable fluororesins among them are polyvinylidene fluoride and vinylidene fluoride copolymers. The vinylidene fluoride copolymers are preferably hexafluoropropylene-vinylidene fluoride copolymers.

The fluororesin may be cross-linked, so that the microporous composite membrane can absorb an electrolytic solution, and can be made free from deformation when swelled at high temperatures. The cross-linking method may be a method of irradiating ionizing radiations, a method of using cross-linking agents, a vulcanizing method, etc. The ionizing radiations may be α-rays, β-rays, γ-rays, electron beams, etc. The cross-linking agents may be compounds having 2 or more unsaturated bonds such as butadiene, isoprene, etc.

The fluororesin may be modified by graft polymerization. Compounds usable for graft polymerization are, for instance, ethylene, styrene, vinyl chloride, vinyl acetate, acrylic acid, methyl acrylate, methyl vinyl ketone, acrylamide, acrylonitrile, vinylidene chloride, methacrylic acid, methyl methacrylate, etc. The fluororesin is provided with improved adhesion to electrodes by graft polymerization with the above compounds. The fluororesin may contain other resins, unless its effects are deteriorated.

The melting point of the fluororesin preferably is higher than that of a polyolefin constituting the microporous polyolefin membrane, more preferably higher than the latter by 5° C. or more.

[3] Production Method of Microporous Composite Membrane

The microporous composite membrane of the present invention can be produced by coating at least one surface of a microporous polyolefin membrane with a solution of the above fluororesin in a mixed solvent of a good solvent for the fluororesin, and a poor solvent having a dipole moment of 1.8 Debye or less, and drying the resultant coating. When the solvent is composed only of a good solvent, the fluororesin layer has too dense a structure to form cylindrical fine pores, resulting in deteriorated permeability. On the other hand, when the solvent is composed only of a poor solvent, the fluororesin is not well dispersed, making it difficult to coat the mixed-solvent solution.

The good solvents may be, for instance, acetone, N-methyl-2-pyrrolidone (NMP), dimethylformamide (DMF), dimethyl sulfoxide (DMSO), cyclohexanone, γ-butyrolactone (GBL), ethylene carbonate, dimethyl acetamide, methyl ethyl ketone (MEK), diethyl ether, ethyl acetate, tetrahydrofuran (THF), triethyl phosphate, and acetic anhydride. Among them, the good solvent is preferably acetone.

The poor solvent should have a dipole moment of 1.8 Debye or less. When the dipole moment of the poor solvent is more than 1.8 Debye, no cylindrical fine pores are formed in the fluororesin layer, resulting in the microporous composite membrane with extremely poor permeability. The dipole moment of the poor solvent is preferably 1.0 Debye or less. The poor solvent having a dipole moment of 1.8 Debye or less may be, for instance, at least one selected from the group consisting of aromatic hydrocarbons having 6 or more carbon atoms, 1-butanol, tert-butanol, isobutanol, and aliphatic hydrocarbons having 5 or more carbon atoms. A preferable poor solvent is at least one selected from the group consisting of toluene (dipole moment: 0.375 Debye), o-xylene (dipole moment: 0.44 Debye), m-xylene (dipole moment: 0.35 Debye), p-xylene (dipole moment: 0 Debye), ethylbenzene (dipole moment: 0.35 Debye), 1-butanol (dipole moment: 1.68 Debye), tert-butanol (dipole moment: 1.66 Debye), and isobutanol (dipole moment: 1.79 Debye). The dipole moment is a value calculated by a molecular orbital method. It should be noted that the above poor solvent having a dipole moment of 1.8 Debye or less may contain small amounts of poor solvents having dipole moments of more than 1.8 Debye, if necessary, unless the effects of the present invention are deteriorated.

Fine pores are formed by causing the fluororesin to have a micro-phase separation structure by the action of a poor solvent and fixing it by removing the poor solvent. If the good solvent remained after the poor solvent is removed, there would be adverse effect on the fixing of the phase separation structure. Accordingly, it is preferable that the good solvent is evaporated earlier than the poor solvent in a drying step. Thus, the boiling point of the poor solvent is preferably equal to or higher than that of the good solvent, more preferably higher than that of the good solvent. The good solvent is preferably not azeotropic with the poor solvent.

Specifically, the difference in a boiling point between the good solvent and the poor solvent is preferably 30° C. or more, more preferably 50° C. or more. For instance, when the good solvent is acetone (boiling point: 56.5° C.), the use of a poor solvent whose boiling point differs from that of the good solvent by 30° C. or more is better than the use of ethanol (boiling point: 78.3° C., dipole moment: 1.68 Debye) or isopropyl alcohol (boiling point: 82.4° C., dipole moment: 1.79 Debye) as a poor solvent, to achieve easy control of the penetrating pore diameter, and to cause penetrating pores to have exactly cylindrical shapes.

A specific example of the poor solvent preferable for acetone may be at least one selected from the group consisting of toluene (boiling point: 110.6° C.), o-xylene (boiling point: 144.4° C.), m-xylene (boiling point: 139.1° C.), p-xylene (boiling point: 138.4° C.), ethylbenzene (boiling point: 136.2° C.), 1-butanol (boiling point: 117.7° C.), and isobutanol (boiling point: 107.9° C.). A preferred good solvent/ poor solvent combination is acetone/xylene (at least one selected from the group consisting of o-xylene, m-xylene and p-xylene), acetone/toluene, or acetone/butanol (1-butanol and/or tert-butanol).

The amount of the fluororesin in the mixed solution can be properly adjusted depending on coating methods and the thickness of a coating layer to be formed, though it is usually 1-20% by mass. Though not particularly restricted, a mixing weight ratio of the good solvent to the poor solvent is preferably 10/90-95/5, more preferably 20/80-90/10, particularly 30/70-90/10.

The coating of the mixed solution can be conducted by well-known casting or coating methods, such as a roll coater method, an air-knife coater method, a blade coater method, a rod coater method, a bar coater method, a comma coater method, a gravure coater method, a silk screen method, a die coater method, a microgravure coater method, etc.

After the coating of the mixed solution, the good solvent and the poor solvent are removed by drying. The drying may be conducted by well-known methods such as air drying, hot-air drying, heating in an oven, etc. Vacuum drying may be conducted, if necessary. The air drying is preferably followed by heat drying. The air drying method may be, for instance, a method of blowing a low-moisture gas. The heat-drying temperature is preferably in a range of 50-90° C., and the heat-drying time is preferably in a range of 1-10 minutes.

The average penetrating pore diameter (average diameter of penetrating cylindrical pores) of the fluororesin layer can be controlled by properly selecting the type of a poor solvent, the concentration of a poor solvent in the mixed solution, a drying speed, etc.

The above method can produce a composite membrane having excellent adhesion of the fluororesin layer to the microporous polyolefin membrane. Accordingly, the composite membrane of the present invention exhibits excellent durability when used for separators.

[4] Microporous Composite Membrane

The microporous composite membrane according to a preferred embodiment of the present invention has the following properties.

(1) Air permeability (JIS P8117, converted to the value at 20-μm thickness) of 10-1,500 seconds/100 cc, preferably 20-1,500 seconds/100 cc. When the air permeability exceeds 1,500 seconds/100 cc, battery separators formed by the microporous composite membrane provide batteries with small capacity at a high-rate discharge or a low-temperature discharge. On the other hand, when the air permeability is less than 10 seconds/100 cc, sufficient shutdown cannot be achieved when the battery temperature has increased.

(2) Pin puncture strength of 2,500 mN/20 μm or more, preferably 3,000 mN/20 μm or more. When the pin puncture strength is less than 2,500 mN/20 μm, short-circuiting is likely to occur when separators formed by the microporous composite membrane are assembled in batteries.

(3) Heat shrinkage ratio of 35% or less, preferably 30% or less, in both MD and TD after treated at a temperature of 130° C. for 1 hour. When the heat shrinkage ratio exceeds 35%, battery separators formed by the microporous composite membrane shrink in their edge portions by the abnormal heat generation of batteries in which the separators are assembled, making short-circuiting highly likely.

(4) With respect to shutdown properties, the air permeability is 10,000 seconds/100 cc or more after treated at a temperature of 130° C. for 1 hour.

(5) Meltdown temperature of 155° C. or higher.

(6) With respect to the adhesion to electrodes, electrodes are unlikely to peel off from the microporous composite membrane, when they are pressed by a pressing machine for 5 minutes while heating at 40° C., and then immersed in an electrolytic solution.

As described above, because the microporous composite membrane of the present invention has well-balanced permeability, adhesion to electrodes, mechanical strength, heat shrinkage resistance, shutdown properties, and meltdown properties, it is suitable for battery separators, separating membranes, etc. Though the thickness of the microporous composite membrane may be properly selected depending on applications, it is preferably 5-200 μm, for instance, when used for battery separators.

The separators formed by the microporous composite membrane of the present invention may be used for any batteries, and suitably for lithium secondary batteries. The lithium secondary batteries using separators formed by the microporous composite membrane of the present invention may comprise known electrodes and electrolytic solutions, and may have known structures.

The present invention will be explained in more detail referring to Examples below without intention of restricting the scope of the present invention.

Example 1

(1) Preparation of Fluororesin Solution in Mixed Solvent 2.7 parts by mass of a hexafluoropropylene-vinylidene fluoride copolymer having a hexafluoropropylene content of about 10% by mass and a melt viscosity of 2,300-2,700 Pa·s (trade name: Kynar2801 available from ATOFINA) was dissolved in 73 parts by mass of acetone at room temperature to prepare a fluororesin solution. 75.7 parts by mass of the resultant fluororesin solution was mixed with 24.3 parts by mass of mixed xylene [the total content of o-xylene (dipole moment: 0.44 Debye) and m-xylene (dipole moment: 0.35 Debye) was 80 mole % or more], to prepare a solution of the fluororesin in mixed solvent (mixed solution).

(2) Formation of Coating Layer

A microporous polyethylene membrane [trade name: SETELA available from Tonen Chemical Corporation, thickness: 21.9 μm, air permeability: 253 sec/100 cc, pin puncture strength: 3,028 mN/20 μm, heat shrinkage ratio: 16% (MD, 105° C./8 hrs.), 5.5% (TD, 105° C./8 hrs.), tensile rupture strength: 90 MPa (MD), 65 MPa (TD), average diameter of penetrating pores: 0.04 μm, maximum pore diameter: 0.2 μm, porosity: 47%] was coated with the above mixed solution by a microgravure coater (roll mesh: #55, roll diameter: 20 mm, number of revolution: 48 rpm), while being conveyed at a speed of 2 m/minute. It was then dried while passing through a 4-m-long drying furnace controlled at 60° C. to produce a microporous composite membrane.

Example 2

A microporous composite membrane was produced in the same manner as in Example 1, except for using toluene (dipole moment: 0.375 Debye) as a poor solvent to prepare the fluororesin solution in a mixed solvent.

Example 3

A microporous composite membrane was produced in the same manner as in Example 1, except for changing the acetone content to 68.1 parts by mass, and adding 29.2 parts by mass of 1-butanol (dipole moment: 1.68 Debye) as a poor solvent to prepare the fluororesin solution in a mixed solvent.

Example 4

A microporous composite membrane was produced in the same manner as in Example 1, except for using "Kynar2821" (trade name, available from ATOFINA, hexafluoropropylene content: about 10% by mass, melt viscosity: 1200-2,000 Pa·s) as a hexafluoropropylene-vinylidene fluoride copolymer, changing the acetone content to 77.8 parts by mass, and changing the mixed xylene content to 19.5 parts by mass, to prepare the fluororesin solution in a mixed solvent.

Example 5

A microporous composite membrane was produced in the same manner as in Example 4, except for using toluene as a poor solvent to prepare the fluororesin solution in a mixed solvent.

Example 6

A microporous composite membrane was produced in the same manner as in Example 4, except for using "Kynar2851" (trade name, available from ATOFINA, hexafluoropropylene content: about 5% by mass, melt viscosity: 1700-2,700 Pa·s) as a hexafluoropropylene-vinylidene fluoride copolymer to prepare the fluororesin solution in a mixed solvent.

Comparative Example 1

A microporous composite membrane was produced in the same manner as in Example 1, except for changing the acetone content to 97.3 parts by mass, and adding no poor solvent, to prepare the fluororesin solution in a mixed solvent.

Comparative Example 2

A microporous composite membrane was produced in the same manner as in Example 1, except for changing the acetone content to 68.1 parts by mass, and adding 29.2 parts by mass of butyl acetate (dipole moment: 1.84 Debye) as a poor solvent, to prepare the fluororesin solution in a mixed solvent.

Comparative Example 3
(1) Preparation of Fluororesin Solution in Mixed Solvent 2.7 parts by mass of a hexafluoropropylene-vinylidene fluoride copolymer (trade name: Kynar2801) was dissolved in 97.3 parts by mass of N-methyl-2-pyrrolidone (NMP) at room temperature to prepare a fluororesin solution in NMP.

(2) Formation of Coating Layer

The same microporous polyethylene membrane (trade name: SETELA) as in Example 1 was coated with the above fluororesin solution in NMP by a microgravure coater (roll mesh: #55, roll diameter: 20 mm, the number of revolution: 48 rpm), while being conveyed at a speed of 2 m/minute. A sample of 6 cm×6 cm was cut out of the coated membrane, and immersed in an ethanol bath at room temperature for 0.1 minutes. It was then dried in an oven controlled at 60° C. for 5 minutes to produce a microporous composite membrane.

Comparative Example 4

A microporous composite membrane was produced in the same manner as in Comparative Example 3, except for immersing a sample membrane coated with the same fluororesin solution in NMP as in Comparative Example 3 in a 1-butanol bath.

Comparative Example 5

A microporous composite membrane was produced in the same manner as in Comparative Example 3, except for immersing a sample membrane coated with the same fluororesin solution in NMP as in Comparative Example 3 in a mixed xylene bath.

Comparative Example 6

A microporous composite membrane was produced in the same manner as in Comparative Example 3, except for immersing a sample membrane coated with the same fluororesin solution in NMP as in Comparative Example 3 in a toluene bath.

Figure 1:
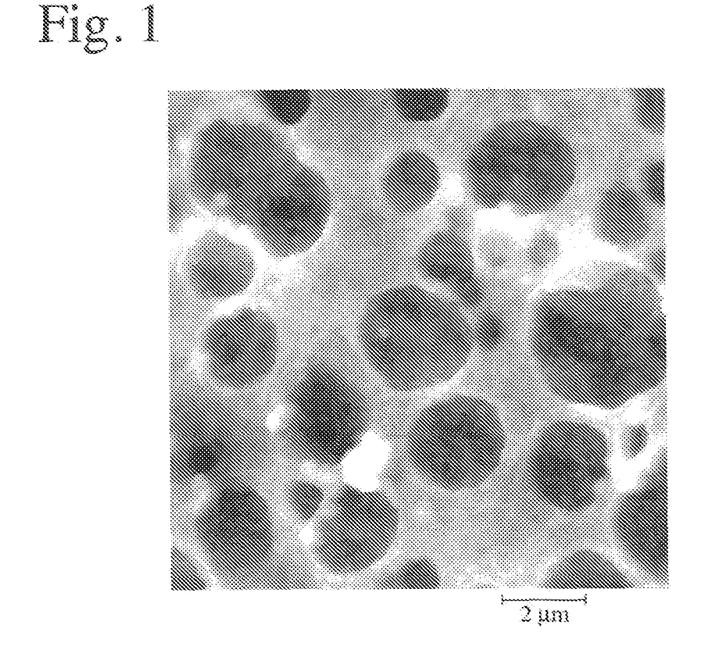
FIG. 1 is a probe photomicrograph (×7,500) showing a surface of the microporous composite membrane of Example 1.
Figure 2:
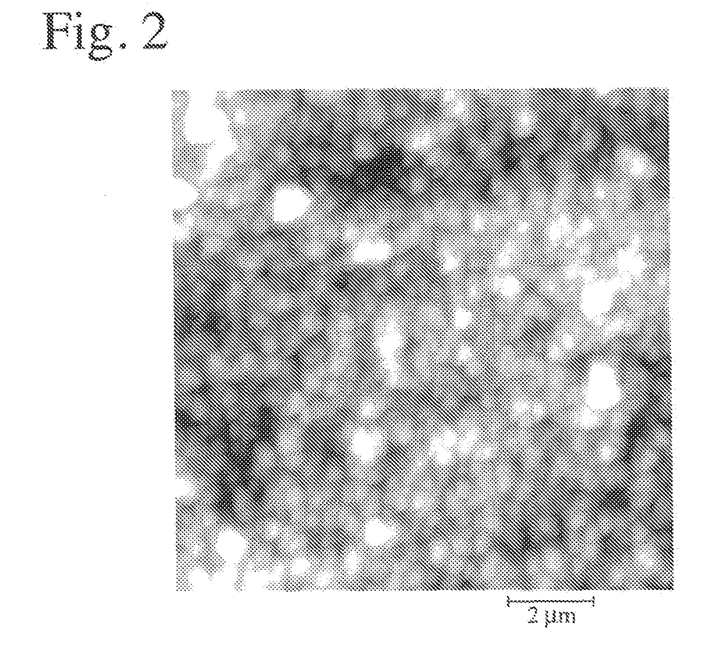
FIG. 2 is a probe photomicrograph (×7,500) showing a surface of the microporous composite membrane of Comparative Example 1.

Probe photomicrographs (×7,500) taken on the surfaces of the microporous composite membranes of Example 1 and Comparative Example 1 are shown in FIG. 1 (Example 1) and FIG. 2 (Comparative Example 1). As shown in FIG. 1, the microporous composite membrane of Example 1 has cylindrical penetrating pores having diameters of 0.4-4 µm. On the other hand, as shown in FIG. 2, fluororesin particles are accumulated in the microporous composite membrane of Comparative Example 1 with no cylindrical fine pores.

The properties of the microporous composite membranes obtained in Examples 1-6 and Comparative Examples 1-6 were measured by the following methods. As Comparative Example 7, the properties of the microporous polyethylene membrane used in Examples 1-6 and Comparative Examples 1-6 were also measured by the same methods.

(1) State of coating layer: Observed by a probe microscope.

(2) Thickness of coating layer: The thickness of the membrane with a coating layer was measured by a contact thickness meter (available from Mitutoyo Corporation), and its difference from the thickness of the microporous polyethylene membrane was calculated.

(3) Average diameter of penetrating pores in coating layer: The diameters of 10 penetrating pores were measured by a probe microscope, and averaged.

(4) Air permeability: Measured according to JIS P8117, and converted to the value of a 20-µm-thick membrane.

(5) Porosity: Measured by a mass method.

(6) Pin puncture strength: The microporous composite membrane was pricked with a needle of 1 mm in diameter (0.5 mm R) at a speed of 2 mm/second to measure the maximum load, which was converted to the value of a 20-µm-thick membrane.

(7) Heat shrinkage ratio: The microporous composite membrane was treated at a temperature of 130° C. for 1 hour while being constrained to a frame plate (constraining length: 3.5 cm) in MD, to measure a shrinkage ratio in TD.

(8) Shutdown properties: After treated under the conditions of measuring the heat shrinkage ratio (at 130° C. for 1 hour), the air permeability (JIS P8117) was measured, and converted to the value of a 20-µm-thick membrane.

(9) Meltdown properties: The microporous composite membrane was heat-treated at a temperature of 150° C. for 10 minutes while being fixed to a frame plate of 4 cm×3 cm in inner dimension with its longitudinal direction (MD) along the longer side of the frame plate, to observe whether or not the membrane was ruptured. Thereafter, a similar heat treatment was conducted with the temperature elevated stepwise in 5° C. increments, and the temperature at which the membrane was first ruptured was regarded as the meltdown temperature.

(10) Adhesion to electrodes: The microporous composite membrane was sandwiched by two planar electrodes (positive electrode: $LiCoO_2$, negative electrode: graphite), and impregnated with an electrolytic solution (electrolyte: $LiPF_6$, solvent: ethylene carbonate+diethyl carbonate). After heated at 40° C. for 5 minutes while being pressed by a pressing machine, the electrodes were peeled from the microporous composite membrane to evaluate the easiness of peeling. The evaluation standards were "Good" when the peeling was difficult, and "Poor" when the peeling was easy.

TABLE 1

| | Example 1 | Example 2 | Example 3 | Example 4 |
|---|---|---|---|---|
| Microporous Polyolefin Membrane | PE[4] | PE[4] | PE[4] | PE[4] |
| *Coating Solution* | | | | |
| Fluororesin | VDF-HFP[5] | VDF-HFP[5] | VDF-HFP[5] | VDF-HFP[7] |
| Content (wt. %) | 2.7 | 2.7 | 2.7 | 2.7 |
| Good Solvent | Acetone | Acetone | Acetone | Acetone |
| Content (wt. %) | 73.0 | 73.0 | 68.1 | 77.8 |
| Poor Solvent | Mixed Xylene[6] | Toluene | 1-Butanol | Mixed Xylene[6] |
| $\mu^{(1)}$ (Debye) | 0.44/0.34 | 0.375 | 1.68 | 0.44/0.34 |
| Content (wt. %) | 24.3 | 24.3 | 29.2 | 19.5 |
| *Immersion in Poor Solvent After Coating* | | | | |
| Poor Solvent | — | — | — | — |
| $\mu^{(1)}$ (Debye) | — | — | — | — |
| Immersion Time (min.) | — | — | — | — |
| *Drying Conditions* | | | | |
| Temperature (° C.) | 60 | 60 | 60 | 60 |
| Time (min.) | 2 | 2 | 2 | 2 |
| *Properties of Microporous Composite Membrane* | | | | |
| State of Coating Layer | Having cylindrical fine pores. | Having cylindrical fine pores. | Having cylindrical fine pores with fluororesin particles accumulated. | Having cylindrical fine pores. |
| Thickness of Coating Layer (μm) | 1.0 | 1.0 | 0.9 | 0.5 |
| Average Diameter of Penetrating Pores in Coating Layer (μm) | 2 | 2 | 2 | 5 |
| Air Permeability (sec/100 cc) | 523 | 548 | 1,208 | 419 |
| Pin Puncture Strength (mN/20 μm) | 3,733 | 3,645 | 3,361 | 3,616 |
| Heat Shrinkage Ratio (%) in TD | 29 | 29 | 29 | 30 |
| Shutdown Properties[2] (sec/100 cc) | 27,000 | 55,000 | 31,000 | 41,000 |
| Meltdown Temperature (° C.) | 160 | 160 | 160 | 160 |
| *Adhesion to Electrodes[3]* | | | | |
| Positive Electrode | Good | Good | Good | Good |
| Negative Electrode | Good | Good | Good | Good |

| | Example 5 | Example 6 | Comparative Example 1 | Comparative Example 2 |
|---|---|---|---|---|
| Microporous Polyolefin Membrane | PE[4] | PE[4] | PE[4] | PE[4] |
| *Coating Solution* | | | | |
| Fluororesin | VDF-HFP[7] | VDF-HFP[8] | VDF-HFP[5] | VDF-HFP[5] |
| Content (wt. %) | 2.7 | 2.7 | 2.7 | 2.7 |
| Good Solvent | Acetone | Acetone | Acetone | Acetone |
| Content (wt. %) | 77.8 | 77.8 | 97.3 | 68.1 |
| Poor Solvent | Toluene | Mixed Xylene[6] | — | Butyl Acetate |
| $\mu^{(1)}$ (Debye) | 0.375 | 0.44/0.34 | — | 1.84 |
| Content (wt. %) | 19.5 | 19.5 | — | 29.2 |
| *Immersion in Poor Solvent After Coating* | | | | |
| Poor Solvent | — | — | — | — |
| $\mu^{(1)}$ (Debye) | — | — | — | — |
| Immersion Time (min.) | — | — | — | — |
| *Drying Conditions* | | | | |
| Temperature (° C.) | 60 | 60 | 60 | 60 |
| Time (min.) | 2 | 2 | 2 | 2 |

TABLE 1-continued

| | Properties of Microporous Composite Membrane | | | |
|---|---|---|---|---|
| State of Coating Layer | Having cylindrical fine pores. | Having cylindrical fine pores. | Without clearly formed fine pores, fluororesin particles were accumulated. | Without clearly formed fine pores, fluororesin particles were accumulated. |
| Thickness of Coating Layer (μm) | 0.5 | 0.4 | 0.8 | 0.5 |
| Average Diameter of Penetrating Pores in Coating Layer (μm) | 5 | 5 | Could not be measured. | Could not be measured. |
| Air Permeability (sec/100 cc) | 683 | 362 | 65,000 | 5,800 |
| Pin Puncture Strength (mN/20 μm) | 3,410 | 3,361 | 3,528 | 3,479 |
| Heat Shrinkage Ratio (%) in TD | 30 | 29 | 28 | 28 |
| Shutdown Properties[2] (sec/100 cc) | 100,000 | 31,000 | >100,000 | 60,000 |
| Meltdown Temperature (° C.) | 160 | 160 | 160 | 160 |
| Adhesion to Electrodes[3] | | | | |
| Positive Electrode | Good | Good | Good | Good |
| Negative Electrode | Good | Good | Good | Good |

| | No. | | | |
|---|---|---|---|---|
| | Comparative Example 3 | Comparative Example 4 | Comparative Example 5 | Comparative Example 6 |
| Microporous Polyolefin Membrane | PE[4] | PE[4] | PE[4] | PE[4] |
| | Coating Solution | | | |
| Fluororesin | VDF-HFP[5] | VDF-HFP[5] | VDF-HFP[5] | VDF-HFP[5] |
| Content (wt. %) | 2.7 | 2.7 | 2.7 | 2.7 |
| Good Solvent | NMP[9] | NMP[9] | NMP[9] | NMP[9] |
| Content (wt. %) | 97.3 | 97.3 | 97.3 | 97.3 |
| Poor Solvent | — | — | — | — |
| $\mu$[1] (Debye) | — | — | — | — |
| Content (wt. %) | — | — | — | — |
| | Immersion in Poor Solvent After Coating | | | |
| Poor Solvent | Ethanol | 1-Butanol | Mixed Xylene[6] | Toluene |
| $\mu$[1] (Debye) | 1.68 | 1.68 | 0.44/0.34 | 0.375 |
| Immersion Time (min.) | 0.1 | 0.1 | 0.1 | 0.1 |
| | Drying Conditions | | | |
| Temperature (° C.) | 60 | 60 | 60 | 60 |
| Time (min.) | 5 | 5 | 5 | 5 |
| | Properties of Microporous Composite Membrane | | | |
| State of Coating Layer | Fibrous fluororesin was accumulated. | Fine pores were insufficiently formed, and coating layer was peeled. | Fine pores were insufficiently formed, and coating layer was peeled. | Fine pores were insufficiently formed, and coating layer was peeled. |
| Thickness of Coating Layer (μm) | 0.8 | 0 | 0 | 0 |
| Average Diameter of Penetrating Pores in Coating Layer (μm) | Could not be measured. | — | — | — |
| Air Permeability (sec/100 cc) | 1,551 | 265 | 260 | 259 |
| Pin Puncture Strength (mN/20 μm) | 3,224 | 3,038 | 2,999 | 3,018 |
| Heat Shrinkage Ratio (%) in TD | 29 | 32 | 32 | 32 |
| Shutdown Properties[2] (sec/100 cc) | 50,000 | 1,900 | 1,810 | 1,850 |
| Meltdown Temperature (° C.) | 160 | 155 | 155 | 155 |

TABLE 1-continued

| Adhesion to Electrodes[3] | | | | |
|---|---|---|---|---|
| Positive Electrode | Good | Poor | Poor | Poor |
| Negative Electrode | Good | Poor | Poor | Poor |

| | No. Comparative Example 7 |
|---|---|
| Microporous Polyolefin Membrane | PE[4] |
| Coating Solution | |
| Fluororesin | — |
| Content (wt. %) | — |
| Good Solvent | — |
| Content (wt. %) | — |
| Poor Solvent | — |
| μ[1] (Debye) | — |
| Content (wt. %) | — |
| Immersion in Poor Solvent After Coating | |
| Poor Solvent | — |
| μ[1] (Debye) | — |
| Immersion Time (min.) | — |
| Drying Conditions | |
| Temperature (° C.) | — |
| Time (min.) | — |
| Properties of Microporous Composite Membrane | |
| State of Coating Layer | — |
| Thickness of Coating Layer (μm) | — |
| Average Diameter of Penetrating Pores in Coating Layer (μm) | — |
| Air Permeability (sec/100 cc) | 253 |
| Pin Puncture Strength (mN/20 μm) | 3,028 |
| Heat Shrinkage Ratio (%) | 16 (MD)/5.5 (TD)[10] |
| Shutdown Properties[2] (sec/100 cc) | 1,820 |
| Meltdown Temperature (° C.) | 155 |
| Adhesion to Electrodes[3] | |
| Positive Electrode | Poor |
| Negative Electrode | Poor |

Note:
[1]Dipole moment.
[2]Air permeability after treated at a temperature of 130° C. for 1 hour.
[3]The microporous composite membrane was sandwiched by two planar electrodes (positive electrode: LiCoO$_2$, negative electrode: graphite), impregnated with an electrolytic solution (electrolyte: LiPF$_6$, solvent: ethylene carbonate + diethyl carbonate), and heated at 40° C. for 5 minutes while being pressed by a pressing machine. The electrodes were peeled from the microporous composite membrane to evaluate the easiness of peeling.
[4]Polyethylene microporous membrane (trade name: SETELA, available from Tonen Chemical Corporation).
[5]Hexafluoropropylene-vinylidene fluoride copolymer (trade name: Kynar2801 available from ATOFINA, hexafluoropropylene content: about 10% by mass, melt viscocity: 2300-2700 Pa·s).
[6]The total content of o-xylene (dipole moment: 0.44 Debye) and m-xylene (dipole moment: 0.35 Debye) was 80 mole % or more.
[7]Hexafluoropropylene-vinylidene fluoride copolymer (trade name: Kynar2821 available from ATOFINA, hexafluoropropylene content: about 10% by mass, melt viscocity: 1200-2000 Pa·s).
[8]Hexafluoropropylene-vinylidene fluoride copolymer (trade name: Kynar2851 available from ATOFINA, hexafluoropropylene content: about 5% by mass, melt viscocity: 1700-2700 Pa·s).
[9]N-methyl-2-pyrrolidone.
[10]The shrinkage ratios of the microporous membrane in both longitudinal direction (MD) and transverse direction (TD) were measured three times each after treated at a temperature of 105° C. for 8 hours, and averaged.

As shown in Table 1, the microporous composite membranes of Examples 1-6 produced by the method of the present invention were excellent in air permeability, pin puncture strength, heat shrinkage ratio, shutdown properties, meltdown properties and adhesion to electrodes. On the other hand, no cylindrical fine pores were formed in Comparative Example 1 because the coating solution did not contain a poor solvent, resulting in poor air permeability. Because the coating solution contained a poor solvent having a dipole moment of more than 1.8 Debye in Comparative Example 2, no cylindrical fine pores were formed, resulting in poor air permeability. Because the coating solution did not contain a poor solvent, and the membrane was immersed in a poor solvent after coating in Comparative Example 3, no cylindrical fine pores were formed, resulting in poor air permeability. Because the coating solution did not contain a poor solvent, and the membrane was immersed in a poor solvent after coating in Comparative Examples 4-6, fine pores were formed insufficiently, and the coating layer peeled off. Because a fluororesin layer was not formed in Comparative Example 7, the shutdown properties and the adhesion to electrodes were poor.

EFFECT OF THE INVENTION

Having a porous fluororesin coating layer formed by coating at least one surface of a microporous polyolefin membrane with a solution of a gelable fluororesin in a mixture of a good solvent for the fluororesin and a poor solvent having a dipole moment of 1.8 Debye or less, and drying, the microporous composite membrane of the present invention with cylindrical penetrating pores formed in the coating layer has well-balanced permeability, adhesion to electrodes, mechanical strength, heat shrinkage resistance, shutdown properties and meltdown properties.

When used for battery separators, the microporous composite membrane of the present invention provides batteries with excellent safety and reliability, because it has good affinity for an electrolytic solution and thus excellent absorption of the electrolytic solution in the production steps of batteries, is stable for a cell reaction, generating no gaps between battery members even after the repletion of charge and discharge, has a small electrode-separator interface resistance, and keeps insulation for a long period of time. Further, the microporous composite membrane of the present invention having excellent wettability to agent solutions, separatability, permeability and mechanical strength is suitable for separating membranes.

What is claimed is:

1. A method for producing a microporous composite membrane comprising a porous coating layer for having excellent adhesion to electrodes without deteriorating permeability, comprising the steps of (1) coating at least one surface of a microporous polyolefin membrane with a solution of a gelable fluororesin in a mixed solvent of a good solvent for said fluororesin and a poor solvent having a dipole moment of 1.8 Debye or less and a higher boiling point than that of said good solvent, such that the resultant porous coating layer of said fluororesin has a thickness of 0.4-1.0 µm, said fluororesin being a hexafluoropropylene-vinylidene fluoride copolymer, and (2) heating it to evaporate said good solvent earlier than said poor solvent, so that said porous coating layer has cylindrical penetrating pores, which are fine pores penetrating substantially perpendicularly from openings to a surface in contact with said microporous polyolefin membrane while keeping circular cross sections of substantially the same diameters, and have a larger average diameter than the maximum pore diameter of said microporous polyolefin membrane.

* * * * *